(No Model.)

A. M. WRIGHT.
CAR WHEEL.

No. 244,412.  Patented July 19, 1881.

Witnesses—
F. B. Townsend
Chas. Gaylord.

Inventor—
Abner M. Wright,
By R. C. Dyrenforth,
Attorney

UNITED STATES PATENT OFFICE.

ABNER M. WRIGHT, OF CHICAGO, ILLINOIS.

CAR-WHEEL.

SPECIFICATION forming part of Letters Patent No. 244,412, dated July 19, 1881.

Application filed March 11, 1881. (No model.)

*To all whom it may concern:*

Be it known that I, ABNER M. WRIGHT, a citizen of the United States, residing at Chicago, in the county of Cook and State of Illinois, have invented certain new and useful Improvements in Car-Wheels; and I hereby declare the following to be full, clear and exact description thereof, reference being had to the accompanying drawings, of which—

Figure 1:
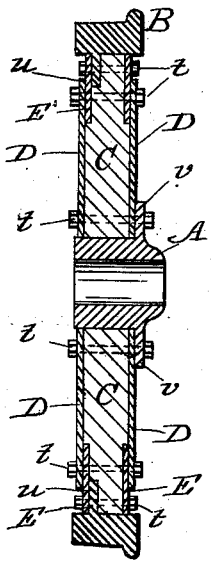
Figure 2:
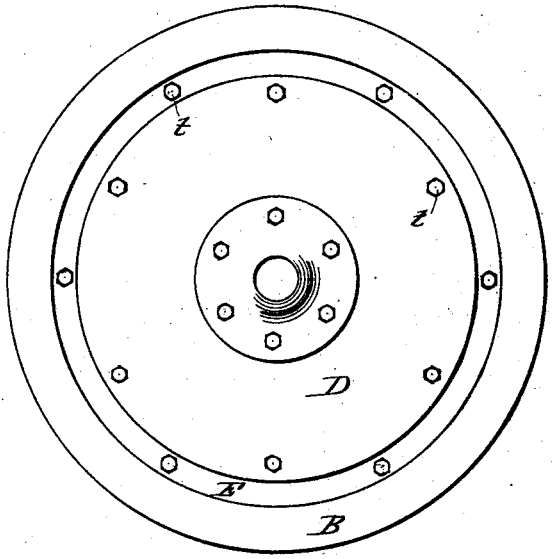

Figure 1 is a central cross-section of my wheel; Fig. 2, an inner side elevation of the same, and Fig. 3 a detail view.

My invention relates to the class of car-wheels in which the body between the tire and the hub comprises a fibrous packing inclosed between metal disks; and my object is so to construct the wheel that it shall have more than ordinary strength, and at the same time that the entire burden shall come upon the non-resonant packing, relieving the inclosing-plates entirely from vertical strain or pressure.

In the drawings, A is the hub, provided near its inner end with the flange $v$, and B the tire, provided near its outer edge with the flange $u$.

C is the packing, which may consist of paper or of veneer with the grains of its separate layers set at intersecting angles, or of any other suitable material.

D D are two annular metal plates incasing the packing C, and each extending from the hub nearly to the tire.

E E are two other and narrower annular plates, extending from the tire inward to a point beyond the outer edges of the plates D, whereby they are lapped by the latter.

The arrangement is such that the plates E fit closely within the plates D, and that one of the plates D is in contact with the inner face of the flange $v$, and the opposite plate E in contact with the outer face of the flange $u$. The plates E may each be formed either whole or in sections.

The parts are secured together by means of three circles of bolts and nuts, $t$, the inner circle passing through the flange $v$, plates D, and the packing, the outer circle passing through the plates E, flange $u$, and the packing, and the intermediate circle passing through the plates D and E, where these plates lap each other, and also through the packing.

Figure 3:
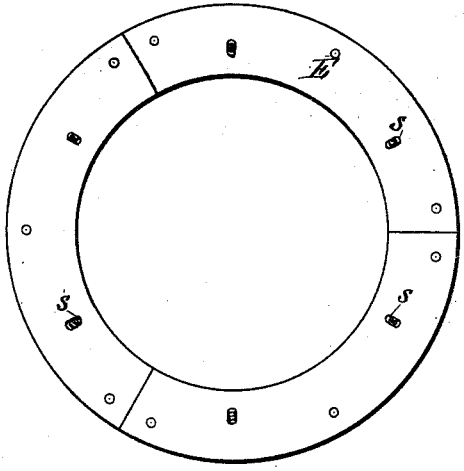

The object of having the plates lap each other in the manner described is to give to the plates E what may be termed a "telescopic" movement within the plates D, in order that all of the vibrations of the tire shall be transmitted to the packing upon which it rests; but it is manifest that if the intermediate bolts $t$ closely fitted the holes of both plates the two would become virtually one plate, and that hence the effect would be neutralized and the object defeated. I accordingly provide the plates E with bolt-holes $s$, larger than the bolts which pass through them, and preferably elongated to form radial slots, as represented in Fig. 3. In this way the said plates are virtually detached from the plates D D, and are left free to take up all the vibration, and thus cause the whole impact to come upon the non-resonant packing. The same effect would be produced by having these bolts pass through near enough to the hub to be clear of the plates E—that is, within the inner circumference of the plates E. Care should be taken in the construction not to have the intermediate circle of bolts bind so closely as to produce friction between the plates. Not only does the above construction tend effectually to deaden the sound, but it also adds strength to the wheel, for the tire, resting as it does upon a comparatively-yielding substance, is less liable to fracture and abrasion than it otherwise would be.

If desired, an independent annular strengthening-plate may be embedded in the packing about midway of its breadth at the periphery and extend from a point at or near the inner surface of the tire inward to any required distance.

What I claim as new, and desire to secure by Letters Patent, is—

In combination with the hub A, having the flange $v$, tire B, having the flange $u$, and packing C, the annular plates E, each rigidly bolted to the flange $u$ of the tire and also to the packing by means of the outermost circle of bolts and nuts $t$, annular plates D overlapping the said plates E, and each rigidly bolted to the flange $v$ of the hub and to the packing by means of the innermost circle of bolts and nuts $t$, and also bolted rigidly to the packing only by the intermediate circle of bolts and nuts $t$, substantially as described.

ABNER M. WRIGHT.

In presence of—
WM. J. HAYDOR,
P. C. DYRENFORTH.